(12) United States Patent
Suzuki et al.

(10) Patent No.: US 7,821,598 B2
(45) Date of Patent: Oct. 26, 2010

(54) METHOD OF MANUFACTURING POLARIZER, POLARIZER, POLARIZING PLATE, AND IMAGE DISPLAY

(75) Inventors: Mitsuru Suzuki, Ibaraki (JP); Seiji Umemoto, Ibaraki (JP); Kazuya Hada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 259 days.

(21) Appl. No.: 12/294,365

(22) PCT Filed: Nov. 27, 2007

(86) PCT No.: PCT/JP2007/072829
§ 371 (c)(1),
(2), (4) Date: Sep. 24, 2008

(87) PCT Pub. No.: WO2008/075540
PCT Pub. Date: Jun. 26, 2008

(65) Prior Publication Data
US 2009/0167994 A1    Jul. 2, 2009

(30) Foreign Application Priority Data
Dec. 21, 2006    (JP)    ............ 2006-343726

(51) Int. Cl.
*G02F 1/1335*    (2006.01)
*G02F 1/13*    (2006.01)

(52) U.S. Cl. .................. 349/96; 349/98; 349/194

(58) Field of Classification Search ........... 349/96–103, 349/194
See application file for complete search history.

(56) References Cited

U.S. PATENT DOCUMENTS 6,606,193 B2 *    8/2003    Umemoto .............. 359/497
6,667,787 B2 *    12/2003    Umemoto ............... 349/96

(Continued)

FOREIGN PATENT DOCUMENTS

EP    1 160 591 A1    12/2001

(Continued)

OTHER PUBLICATIONS

International Search Report of PCT/JP2007/072829, date of mailing Mar. 4, 2008.

*Primary Examiner*—Rhonda S Peace
(74) *Attorney, Agent, or Firm*—Westerman, Hattori, Daniels & Adrian, LLP (57) ABSTRACT

A method of manufacturing a polarizer is provided that makes it possible to manufacture a polarizer prevented from curling even when a liquid is brought into contact with a hydrophilic polymer film by being sprayed. A method of manufacturing a polarizer includes a swelling step A for swelling a hydrophilic polymer film 1 by bringing it into contact with a swelling liquid 2, a dyeing step B for dyeing the hydrophilic polymer film 1 by bringing it into contact with a dye liquid 3 containing a dichroic material, and a crosslinking/stretching step C for crosslinking the hydrophilic polymer film 1 by bringing it into contact with a crosslinking liquid 4 and further stretching it. In the method, the contact with the swelling liquid in the swelling step A is carried out in the gas phase by spraying the swelling liquid 2 onto both surfaces of the hydrophilic polymer film 1.

11 Claims, 4 Drawing Sheets

U.S. PATENT DOCUMENTS

| | | | |
|---|---|---|---|
| 6,961,180 B2 * | 11/2005 | Umemoto | 359/497 |
| 6,964,814 B2 | 11/2005 | Fujii et al. | |
| 7,075,604 B2 * | 7/2006 | Yano et al. | 349/117 |
| 7,203,002 B2 * | 4/2007 | Saiki et al. | 359/491 |
| 7,573,637 B2 * | 8/2009 | Gerlach et al. | 359/490 |
| 2002/0075565 A1 * | 6/2002 | Umemoto | 359/497 |

FOREIGN PATENT DOCUMENTS

| | | |
|---|---|---|
| JP | 6-281816 A | 10/1994 |
| JP | 2001-290027 A | 10/2001 |
| JP | 2001-343529 A | 12/2001 |
| JP | 2002-131543 A | 5/2002 |
| JP | 2003-185834 A | 7/2003 |
| JP | 2004-125816 A | 4/2004 |
| WO | 01/37007 A1 | 5/2001 |

\* cited by examiner

METHOD OF MANUFACTURING POLARIZER, POLARIZER, POLARIZING PLATE, AND IMAGE DISPLAY

TECHNICAL FIELD

The present invention relates to methods of manufacturing polarizers, polarizers, polarizing plates, and image displays.

BACKGROUND ART

Polarizers are used for various liquid crystal displays (LCDs) for television sets, personal computers, cell-phones, etc. Usually, the polarizers are manufactured by dyeing and uniaxially-stretching polyvinyl alcohol (PVA) films. When a PVA film is uniaxially-stretched, the dichroic material adsorbed by (dyeing) the PVA molecules is oriented and thereby the PVA film becomes a polarizer.

Recently, the use of LCDs for television sets is increasing rapidly, and the size of the screens thereof also is increasing. Accordingly, there also are demands for an increase in size of polarizers that are used for television sets. The manufacture of such large-sized polarizers also results in an increase in size of, for example, the manufacturing facility. Therefore, an enormous amount of investment in facility is required.

For example, conventionally, a PVA film is immersed in baths and is stretched while being swelled, dyed, and crosslinked. Thus, a polarizer is produced. This, however, requires large baths when large-sized polarizers are to be manufactured. Furthermore, in the manufacturing method that employs baths, since the liquid concentration in each bath changes over time, cumbersome routine liquid management is necessary, and special equipment such as measuring equipment or a conditioner also is required accordingly.

Examples of the method for solving such problems include a method of spraying a liquid onto a PVA film in the gas phase. With this method, a PVA film can always be brought into contact with a fresh liquid through spraying of the liquid in the gas phase without being affected by the change of the liquid concentration over time. Moreover, since this method requires no bath, it allows the size of the manufacturing facility to be reduced.

Specifically, for example, a method of manufacturing a polarizer has been proposed in which a liquid is brought into contact with a PVA film by shower in a washing step (see Patent Document 1). Furthermore, a method of manufacturing a polarizer also has been proposed in which liquids are sprayed onto a PVA film in a dyeing step and a crosslinking step (see Patent Document 2). However, when polarizers are manufactured by these methods, there is a problem in that the polarizers curl.

[Patent Document 1] JP 2001-290027 A

[Patent Document 2] JP 2003-185834 A

DISCLOSURE OF INVENTION

One object of the present invention is to provide a method of manufacturing a polarizer that makes it possible to manufacture a polarizer prevented from curling even when a liquid is brought into contact with a hydrophilic polymer film by being sprayed.

In order to achieve the aforementioned object, a method of manufacturing a polarizer of the present invention includes:

a swelling step for swelling a hydrophilic polymer film by bringing it into contact with a swelling liquid, a dyeing step for dyeing the hydrophilic polymer film by bringing it into contact with a dye liquid containing a dichroic material, and a stretching step for stretching the hydrophilic polymer film, wherein the contact with the swelling liquid in the swelling step is carried out in the gas phase by spraying the swelling liquid onto both surfaces of the hydrophilic polymer film.

A polarizer of the present invention is manufactured by the aforementioned method of manufacturing a polarizer of the present invention.

A polarizing plate of the present invention includes a protective layer stacked on at least one surface of a polarizer, wherein the polarizer is the aforementioned polarizer of the present invention.

An image display of the present invention includes at least one of a polarizer and a polarizing plate, wherein the polarizer is the aforementioned polarizer of the present invention, and the polarizing plate is the aforementioned polarizing plate of the present invention.

In order to achieve the aforementioned object, the present inventors made a series of studies. As a result, they found that a polarizer was prevented from curling by spraying a swelling liquid onto both the surfaces of a hydrophilic polymer film when the swelling liquid was brought into contact with the film in the gas phase in the swelling step. Thus, the present inventors achieved the present invention. The present invention allows a swelling liquid to be brought into contact with a hydrophilic polymer film by being sprayed. Therefore, as compared to the conventional manufacturing method that employs a bath, the present invention requires neither the increase in size of manufacturing facility nor special equipment, and also does not require management of, for example, the liquid concentration. Accordingly, the manufacturing method of the present invention is applicable to manufacture of large-sized polarizers, at low cost with high efficiency.

BRIEF DESCRIPTION OF DRAWINGS

FIG. 4(a) shows a polarizer that hardly curled, FIG. 4(b) a polarizer where both ends curled slightly, and FIG. 4(c) a polarizer that completely curled.

DETAILED DESCRIPTION OF THE INVENTION

In the manufacturing method of the present invention, it is preferable that the swelling liquid be sprayed for at least 20 seconds. When the time for spraying the swelling liquid is at least 20 seconds, the hydrophilic polymer film can be swelled sufficiently and thereby the polarizer can be prevented more suitably from being curled. The time for spraying the swelling liquid is more preferably in the range of 30 to 120 seconds and further preferably in the range of 40 to 60 seconds.

In the manufacturing method of the present invention, the amount of the swelling liquid to be sprayed onto the hydrophilic polymer film is not particularly limited but is preferably in the range of 0.06 to 0.19 mL/cm$^2$.

In the manufacturing method of the present invention, it is preferable that the contact with the dye liquid in the dyeing step be carried out in the gas phase by spraying the dye liquid onto at least one surface of the hydrophilic polymer film. In the present invention, a polarizer can be prevented from curling by merely spraying the swelling liquid onto both the surfaces of the hydrophilic polymer film in the swelling step. Accordingly, in the dyeing step, the dye liquid may be sprayed on both surfaces or only one surface of the hydrophilic polymer film.

In the manufacturing method of the present invention, it is preferable that the method further include a crosslinking step for crosslinking the hydrophilic polymer film by bringing it into contact with a crosslinking liquid, and a conditioning step for conditioning the hydrophilic polymer film by bringing it into contact with a conditioning liquid, and at least one of the contacts with the crosslinking liquid in the crosslinking step and with the conditioning liquid in the conditioning step be carried out in the gas phase by spraying at least one of the crosslinking liquid and the conditioning liquid onto at least one surface of the hydrophilic polymer film. In the crosslinking step and the conditioning step, the crosslinking liquid and the conditioning liquid also may be sprayed on both surfaces or only one surface of the hydrophilic polymer film.

In the manufacturing method of the present invention, it is preferable that in at least one step selected from the group consisting of the swelling step, the dyeing step, the crosslinking step, and the stretching step, the hydrophilic polymer film be subjected to a continuous treatment while being conveyed. However, the manufacturing method of the present invention is not limited to a continuous treatment but may be a batch treatment.

In the manufacturing method of the present invention, it is preferable that the hydrophilic polymer film be a polyvinyl alcohol film and the dichroic material be iodine.

Next, the method of manufacturing a polarizer of the present invention is described below using an example. The manufacturing method of the present invention uses a hydrophilic polymer film as a material and includes a series of steps such as a swelling step, a dyeing step, a crosslinking step, a stretching step, a conditioning step, and a drying step.

(1) Hydrophilic Polymer Film

The hydrophilic polymer film is not particularly limited and a conventionally known film can be used. Specific examples thereof include hydrophilic polymer films such as a polyvinyl alcohol (PVA) film, a partially formalized PVA film, a polyethylene terephthalate (PET) film, an ethylene-vinyl acetate copolymer film, or films obtained by partially saponifying them. In addition, oriented films formed of polyene such as dehydrated PVA or dehydrochlorinated polyvinyl chloride, as well as stretched and oriented polyvinylene films also can be used. Among these, a PVA polymer film is preferable since it can be dyed well by iodine that serves as a dichroic material described later.

Examples of the raw material polymer for the PVA polymer film include a polymer obtained by polymerizing vinyl acetate and then saponifying it, and a polymer obtained by copolymerizing vinyl acetate with a small amount of copolymerizable monomers, such as unsaturated carboxylic acid or unsaturated sulfonic acid. The polymerization degree of the PVA polymer is not particularly limited. However, in terms of, for example, the solubility to water, the polymerization degree of the PVA polymer is preferably in the range of 500 to 10000 and more preferably in the range of 1000 to 6000.

Furthermore, the saponification degree of the PVA polymer is preferably at least 75 mol % and more preferably in the range of 98 to 100 mol %.

The size of the hydrophilic polymer film (for instance, PVA film) is not particularly limited. However, the thickness thereof is, for example, in the range of 15 to 110 µm, preferably in the range of 38 to 110 µm, more preferably in the range of 50 to 100 µm, and further preferably in the range of 60 to 80 µm. When the manufacturing method of the present invention is carried out through a continuous treatment, the hydrophilic polymer film (for instance, PVA film) is preferably in the form of an original film wound around a roll. In this case, the film is treated in each step while being conveyed. Furthermore, when the manufacturing method of the present invention is carried out by a batch treatment, a hydrophilic polymer film (for instance, PVA film) that has cut into a predetermined size is used.

(2) Swelling Step

The present invention is characterized in that a swelling liquid is sprayed onto both surfaces of the aforementioned hydrophilic polymer film in the gas phase.

Examples of the swelling liquid to be used include water, an aqueous glycerol solution, and an aqueous potassium iodide solution. The temperature of the swelling liquid is not particularly limited but is, for example, in the range of 5 to 50° C., preferably in the range of 10 to 45° C., and more preferably in the range of 20 to 40° C.

A suitable arbitrary spray device is used as a means for spraying the swelling liquid onto the hydrophilic polymer film. Examples of the spray device include "PROCON BOY" (trade name) manufactured by GSI Creos corporation, "MK series" (trade name) manufactured by Fuso Seiki Co., Ltd., "T-AFPV" (trade name) manufactured by DeVILBISS, and "56 series" (trade name) manufactured by ACCUSPRAY. In the spray device, the number of spray nozzles is, for example, in the range of 1 to 10, preferably in the range of 1 to 8, and more preferably in the range of 1 to 4. The hole diameter of each of the spray nozzles is, for example, in the range of 0.3 to 2 mm, preferably in the range of 0.5 to 1.2 mm, and more preferably in the range of 0.75 to 1 mm. The flow rate per spray nozzle is, for example, in the range of 10 to 1200 mL/sec, preferably in the range of 10 to 700 mL/sec, and more preferably in the range of 10 to 150 mL/sec. The spraying air pressure is, for example, in the range of 0.05 to 3 MPa, preferably in the range of 0.1 to 1 MPa, and more preferably in the range of 0.2 to 0.5 MPa. The spray angle is, for example, in the range of 45 to 135, preferably in the range of 60 to 120, and more preferably in the range of 80° to 120°. When a plurality of spray nozzles are used, the distance between adjacent spray nozzles is, for example, in the range of 5 to 500 mm, preferably in the range of 25 to 300 mm, and more preferably in the range of 50 to 200 mm.

When the swelling liquid is sprayed, the distance between the spray nozzle and the hydrophilic polymer film can be determined suitably according to, for example, the spraying air pressure, but is preferably in the range of 15 cm or shorter. When the distance is in the aforementioned range, the swelling liquid can be brought into contact with the hydrophilic polymer film reliably without loss.

The time for spraying the swelling liquid is as described above. The amount of the swelling liquid to be sprayed onto the hydrophilic polymer film also is as described above.

Generally, the hydrophilic polymer film is swollen 1.1 to 1.5 times with respect to the length of the film (original) that has not been swollen yet, by spraying of the swelling liquid.

In this step, the hydrophilic polymer film also may be stretched at the same time. In this case, for example, the stretching means and the stretch ratio are the same as those described later with respect to the stretching step.

(3) Dyeing Step

Next, the hydrophilic polymer film that has been swollen is brought into contact with a liquid (dye liquid) containing a dichroic material.

A conventionally known material can be used as the dichroic material. Examples thereof include iodine and organic dyes. When the organic dyes are used, it is preferable that at least two types be combined from the viewpoint of, for example, neutralization of a visible light region.

A solution containing the dichroic material dissolved in a solvent can be used as the dye liquid. The solvent to be used herein can be, for example, water, and an organic solvent that is compatible with water also may be added. The concentration of the dichroic material in the solution is not particularly limited but is preferably in the range of 0.03 to 0.20 wt %.

When iodine is used as the dichroic material, it is preferable that an iodide also be added as an auxiliary agent in addition to iodine since it can further improve the dyeing efficiency. Examples of the iodide include potassium iodide, lithium iodide, sodium iodide, zinc iodide, aluminum iodide, lead iodide, copper iodide, barium iodide, calcium iodide, tin iodide, and titanium iodide. The ratio of such an iodide to be added is preferably in the range of 0.05 to 10 wt % and more preferably in the range of 0.10 to 5 wt % in the dye liquid.

For instance, when iodine and potassium iodide are used in combination, the ratio (A:B (weight ratio)) between iodine (A) and potassium iodide (B) in the solution is, for example, in the range of 1:5 to 1:100, preferably in the range of 1:7 to 1:50, and more preferably in the range of 1:10 to 1:30.

As described above, it is preferable that the contact with the dye liquid in the dyeing step be carried out in the gas phase by spraying the dye liquid onto at least one surface of the hydrophilic polymer film. In this case, for example, the means and conditions for spraying the dye liquid are the same as those for spraying the swelling liquid.

The contact with the dye liquid may be carried out by a method other than spraying of the dye liquid. For example, the contact may be carried out by, for example, immersing the hydrophilic polymer film in the dye liquid. In this case, a dye bath is used. In this case, the time for immersing the hydrophilic polymer film in the dye liquid (dye bath) is not particularly limited but is, for example, in the range of 5 to 120 seconds, preferably in the range of 10 to 90 seconds, and more preferably in the range of 15 to 60 seconds. The temperature of the dye liquid (dye bath) is, for example, in the range of 5 to 42° C., preferably in the range of 10 to 40° C., and more preferably in the range of 15 to 35° C. Other conditions are the same as those employed in the case of the aforementioned spraying.

In this step, the hydrophilic polymer film may be stretched at the same time. In this case, for example, the stretching means and the stretch ratio are the same as those described later with respect to the stretching step.

(4) Crosslinking Step

Next, the hydrophilic polymer film that has been subjected to the dyeing treatment is bought into contact with a crosslinking liquid containing a crosslinker.

A conventionally known material can be used as the crosslinker. Examples thereof include boron compounds such as boric acid and borax. One of these may be used independently or two or more of them may be used in combination. A solution containing the crosslinker dissolved in a solvent can be used as the crosslinking liquid. For instance, water can be used as the solvent, and further an organic solvent that is compatible with water may be contained.

The concentration of the crosslinker in the solution is not particularly limited. For example, it is preferably in the range of 0.1 to 10 parts by weight, more preferably in the range of 1.5 to 8 parts by weight, and further preferably in the range of 2 to 6 parts by weight, with respect to 100 parts by weight of the solvent (for example, water).

From the viewpoint that uniform in-plane properties of a polarizer can be obtained, the solution containing the crosslinker may contain an auxiliary agent, for example, an iodide such as potassium iodide, lithium iodide, sodium iodide, zinc iodide, aluminum iodide, lead iodide, copper iodide, barium iodide, calcium iodide, tin iodide, or titanium iodide in addition to the boron compound. Among these, a combination of boric acid and potassium iodide is preferable. The content of the auxiliary agent in the solution is, for example, in the range of 0.05 to 15 wt % and preferably in the range of 0.5 to 8 wt %.

As described above, it is preferable that the contact with the crosslinking liquid in the crosslinking step be carried out in the gas phase by spraying the crosslinking liquid onto at least one surface of the hydrophilic polymer film. In this case, the means and conditions for spraying the crosslinking liquid are the same as those for spraying the swelling liquid.

The contact with the crosslinking liquid may be carried out by a method other than spraying of the crosslinking liquid. For example, the contact may be carried out by, for example, immersing the hydrophilic polymer film in the crosslinking liquid. In this case, a crosslinking bath is used. In this case, the time for immersing the hydrophilic polymer film in the crosslinking liquid (crosslinking bath) is not particularly limited but is, for example, in the range of 5 to 120 seconds, preferably in the range of 10 to 100 seconds, and more preferably in the range of 15 to 90 seconds. The temperature of the crosslinking liquid (crosslinking bath) is, for example, in the range of 20 to 70° C. and preferably in the range of 40 to 60° C. Other conditions are the same as those employed in the case of the aforementioned spraying.

In this step, the hydrophilic polymer film may be stretched at the same time. In this case, for example, the stretching means and the stretch ratio are the same as those described later with respect to the stretching step.

(5) Stretching Step

Next, the hydrophilic polymer film is stretched. The hydrophilic polymer film can be stretched using, for example, a suitable arbitrary stretching machine such as a roll stretching machine or a tenter stretching machine by a conventionally known method. This step may be carried out in each of, for example, the swelling step, the dyeing step, and the crosslinking step or may be carried out separately and independently.

When the stretching step is carried out separately and independently, for example, the hydrophilic polymer film may be stretched while being in contact with a stretching liquid.

The stretching liquid is not particularly limited and can be a solution containing, for example, boric acid, potassium iodide, various metal salts, other iodide compounds, and zinc compounds. The solvent that can be used for this solution is, for example, water or ethanol. Preferably, the stretching liquid contains, specifically, for example, boric acid and potassium iodide. The total content of the both is, for example, in the range of 2 to 18 wt %, preferably in the range of 4 to 17 wt %, and more preferably in the range of 6 to 15 wt %. Furthermore, the content ratio (A:B (weight ratio)) between the boric acid (A) and potassium iodide (B) is, for example, in the range of 1:0.1 to 1:4, preferably in the range of 1:0.2 to 1:3.5, and more preferably in the range of 1:0.5 to 1:3.

Preferably, the contact with the stretching liquid in the stretching step is carried out in the gas phase by spraying the stretching liquid onto at least one surface of the hydrophilic polymer film. In this case, the means and conditions for spraying the stretching liquid are the same as those for spraying the swelling liquid.

The contact with the stretching liquid may be carried out by a method other than spraying the stretching liquid. For example, the contact may be carried out by, for example, immersing the hydrophilic polymer film in the stretching liquid. In this case, a stretching bath is used. In this case, the time for immersing the hydrophilic polymer film in the stretching liquid (stretching bath) is not particularly limited but is, for example, in the range of 15 to 180 seconds, preferably in the range of 25 to 165 seconds, and more preferably in the range of 30 to 150 seconds. The temperature of the stretching liquid (stretching bath) is, for example, in the range of 40 to 75° C. and preferably in the range of 50 to 70° C. Other conditions are the same as those employed in the case of the aforementioned spraying.

The stretch ratio of the hydrophilic polymer film in this stretching step is, for example, in the range of 1.05 to 3.0 times, preferably in the range of 1.1 to 2.5 times, and more preferably in the range of 1.2 to 2.0 times, with respect to the length of the hydrophilic polymer film that has been swollen.

(6) Conditioning and Drying Step

Finally, the hydrophilic polymer film is brought into contact with an iodide-containing aqueous solution (conditioning liquid) and is then dried. Thus a polarizer of the present invention is obtained.

The iodide that can be used in the iodide-containing aqueous solution can be one of those described above and particularly, for example, potassium iodide or sodium iodide is preferable. This iodide-containing aqueous solution can wash away remaining boric acid used in the stretching step from the hydrophilic polymer film.

When the aqueous solution is an aqueous potassium iodide solution, the concentration thereof is, for example, in the range of 0.5 to 20 wt %, preferably in the range of 1 to 15 wt %, and more preferably in the range of 1.5 to 7 wt %.

As described above, it is preferable that the contact with the conditioning liquid in the conditioning step be carried out in the gas phase by spraying the conditioning liquid onto at least one surface of the hydrophilic polymer film. In this case, for example, the means and conditions for spraying the conditioning liquid are the same as those for spraying the swelling liquid onto the hydrophilic polymer film. Preferably, the conditioning liquid is sprayed onto at least the surface of the hydrophilic polymer film with which the stretching liquid has been brought into contact.

The contact with the conditioning liquid may be carried out by a method other than spraying of the conditioning liquid. For example, the contact may be carried out by, for example, immersing the hydrophilic polymer film in the conditioning liquid. In this case, a conditioning bath is used. In this case, the time for immersing the hydrophilic polymer film in the conditioning liquid (conditioning bath) is not particularly limited but is, for example, in the range of 2 to 15 seconds and preferably in the range of 3 to 12 seconds. The temperature of the conditioning liquid (conditioning bath) is, for example, in the range of 15 to 40° C. and preferably in the range of 20 to 35° C.

The drying may be carried out by a conventionally known method such as natural drying, air drying, or drying by heating. In the case of drying by heating, the temperature is not particularly limited but is preferably in the range of 25 to 60° C., more preferably in the range of 30 to 50° C., and further preferably in the range of 30 to 45° C.

The swelling step, dyeing step, crosslinking step, stretching step, and conditioning and drying step have been described above. These steps may be carried out separately or the steps that can be combined into one step may be carried out together. Furthermore, the conditioning and drying step may be carried out after every step.

A polarizer can be manufactured through such a series of steps. Usually, the polarizer is cut into a predetermined size for use.

Figure 1:
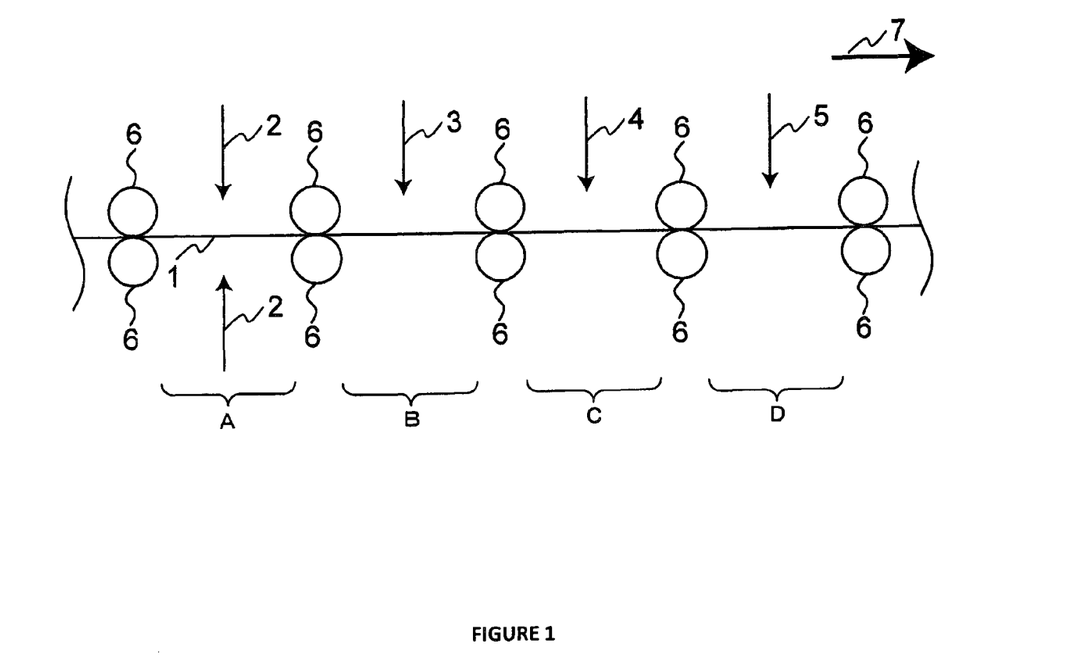
FIG. 1 is a schematic view showing an example of steps of manufacturing a polarizer of the present invention.

FIG. 1 shows an example of steps for manufacturing a polarizer of the present invention. In this example, each step is carried out while the hydrophilic polymer film 1 is conveyed by a plurality of rolls 6. As shown in FIG. 1, steps for manufacturing a polarizer of this example include, as main steps, a swelling step A, a dyeing step B, a crosslinking/stretching step C, and a conditioning step D. In the swelling step A, a swelling liquid 2 is sprayed onto both surfaces of the hydrophilic polymer film 1 in the gas phase. In the dyeing step B, the crosslinking/stretching step C, and the conditioning step D, a dye liquid 3, a crosslinking liquid 4, and a conditioning liquid 5 are sprayed, respectively, onto only one surface of the hydrophilic polymer film 1 in the gas phase. In the crosslinking/stretching step C, the hydrophilic polymer film 1 is crosslinked and stretched at the same time. Furthermore, in FIG. 1, arrows 2, 3, 4, and 5 indicate the directions in which the respective liquids are sprayed, and an arrow 7 indicates the direction in which the hydrophilic polymer film 1 travels.

(7) Polarizer

The thickness of the polarizer of the present invention is not particularly limited but is, for example, in the range of 5 to 40 μm, preferably in the range of 10 to 37 μm, and more preferably in the range of 15 to 35 μm.

(8) Polarizing Plate

A polarizing plate of the present invention has a structure in which a protective layer is stacked on at least one surface of the polarizer of the present invention. The protective layer may be stacked on only one surface or both surfaces of the polarizer. When being stacked on both surfaces, for example, the same type of protective layers may be used or different types of protective layers may be used.

Figure 2:
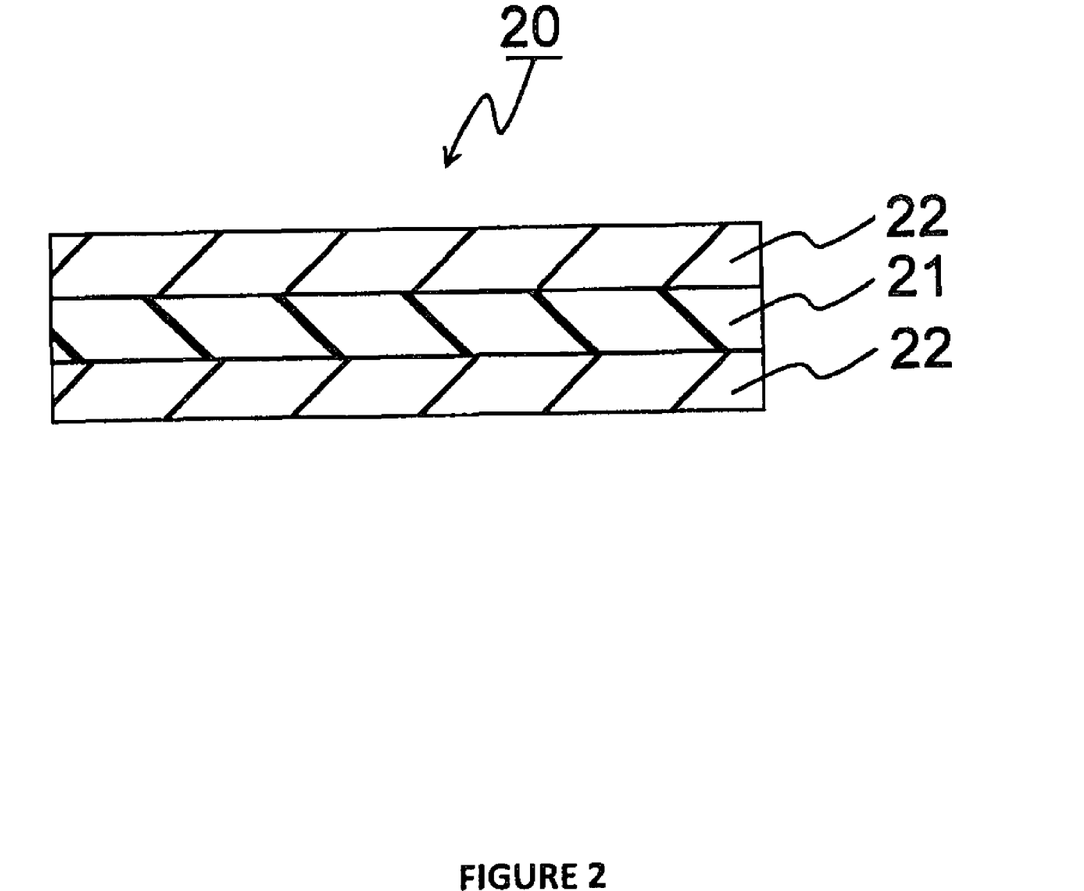
FIG. 2 is a sectional view showing the structure of an example of the polarizing plate according to the present invention.

FIG. 2 shows a sectional view of an example of the polarizing plate of the present invention. As shown in FIG. 2, this polarizing plate 20 includes protective layers 22 stacked on both surfaces of a polarizer 21.

The protective layer 22 is not particularly limited and a conventionally known protective film can be used. It is preferably one that is excellent in, for example, transparency, mechanical strength, thermal stability, moisture barrier properties, and isotropy. Specific examples of the material for such a protective layer include cellulose resins such as triacetylcellulose (TAC), as well as polyester-based, polycarbonate-based, polyamide -based, polyimide -based, polyethersulfone -based, polysulfone -based, polystyrene-based, acrylic-based, acetate-based, and polyolefin-based resins. Further examples include the aforementioned acrylic-based, urethane-based, acrylic urethane-based, epoxy-based, and silicone-based thermosetting resins and ultraviolet-curing resins.

In addition, for example, a film also can be used that is formed of an extruded mixture of a resin composition containing an acrylonitrile-styrene copolymer and an alternating copolymer composed of isobutene and N-methylmaleimide as described in JP 2001-343529 A or WO 01/37007.

Furthermore, such a protective film may have, for example, surfaces saponified with, for instance, an alkali. Particularly, a TAC film is preferable in view of, for example, polarization properties and durability, and a TAC film with surfaces that have been saponified is more preferable.

The thickness of the protective layer is, for example, in the range of 1 to 500 μm, preferably in the range of 5 to 200 μm, and more preferably in the range of 10 to 150 μm.

It is preferable that the protective layer to be used have an optimized phase difference value. The use of such a protective layer does not affect the viewing angle characteristics of an image display.

With respect to the phase difference value of the protective layer, the in-plane phase difference value (Re) of the film is preferably in the range of 0 to 5 nm, more preferably in the range of 0 to 3 nm, and further preferably in the range of 0 to 1 nm, and the phase difference value (Rth) in the direction of the film thickness is preferably in the range of 0 to 15 nm, more preferably in the range of 0 to 12 nm, further preferably in the range of 0 to 5 nm, and most preferably in the range of 0 to 3 nm.

The protective layer can be formed suitably by a conventionally known method such as a method of applying the aforementioned various transparent resins to a polarizer or a method of stacking, for example, films made of the aforementioned resins on the polarizer. Furthermore, commercially available products also can be used.

Moreover, the protective layer further may have been subjected to, for example, a hard-coating treatment, an antireflection treatment, an antisticking treatment, or a treatment carried out for the purpose of, for example, diffusion or antiglare.

For the method of bonding the polarizer and the protective layer, for example, a pressure sensitive adhesive or another adhesive is used and the type thereof can be determined suitably according to, for instance, the type of the polarizer or the protective layer. The thickness of the adhesive layer or pressure sensitive adhesive layer is not particularly limited but is, for example, in the range of 1 to 500 nm, preferably in the range of 10 to 300 nm, and more preferably in the range of 20 to 100 nm.

Figure 3:
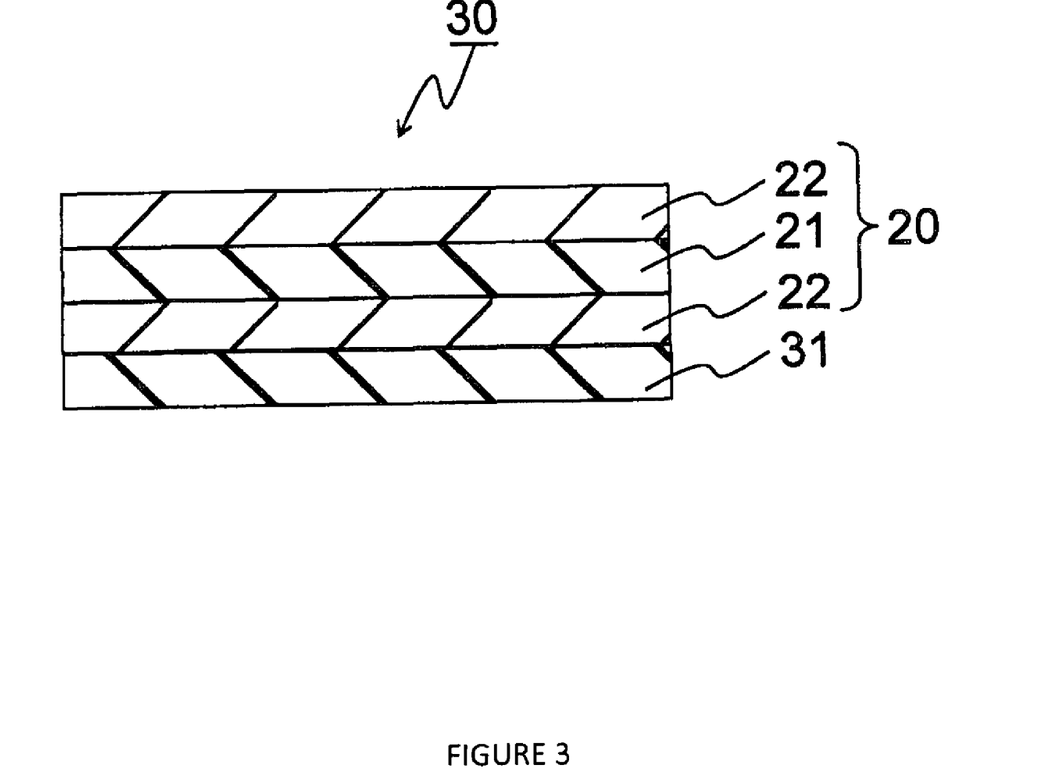
FIG. 3 is a sectional view showing the structure of another example of the polarizing plate according to the present invention.

Preferably, the polarizing plate of the present invention further has a pressure sensitive adhesive layer as its outermost layer because it facilitates stacking the polarizing plate on, for example, a liquid crystal cell. FIG. 3 shows a sectional view of a polarizing plate having such a pressure sensitive adhesive layer. In FIG. 3, the parts identical to those shown in FIG. 2 are indicated with identical numerals. As shown in FIG. 3, the polarizing plate 30 has a structure in which a pressure sensitive adhesive layer 31 further is disposed on the surface of one protective layer 22 of the polarizing plate 20.

The pressure sensitive adhesive layer can be formed on the surface of the protective layer by, for example, a method in which a solution or melt of a pressure sensitive adhesive is applied directly to a predetermined surface of the protective layer to form a layer by a development method such as casting or coating, or a method in which a pressure sensitive adhesive layer is formed on the separator described later in the same manner and is then transferred and allowed to adhere to a predetermined surface of the protective layer. Such a pressure sensitive adhesive layer may be formed on either one of the surfaces of the polarizing plate as shown in FIG. 3 described above but is not limited thereto. Pressure sensitive adhesive layers may be disposed on both the surfaces as required.

The pressure sensitive adhesive layer can be formed by suitably using a conventionally known pressure sensitive adhesive, for example, an acrylic-based, silicone-based, polyester-based, polyurethane-based, polyether-based, or rubber-based pressure sensitive adhesive. Preferably, the surface of the pressure sensitive adhesive layer is covered with a separator for the purpose of, for example, contamination control. The separator can be formed by, for example, a method in which a release coating formed of a silicone-based, long-chain alkyl-based, fluorine-based, or molybdenum sulfide release agent is provided for a thin layer film such as the protective film as required.

The thickness of the pressure sensitive adhesive layer is not particularly limited and is, for example, in the range of 5 to 35 μm, preferably in the range of 10 to 25 μm, and more preferably in the range of 15 to 25 μm.

(9) Applications

The polarizer and polarizing plate of the present invention can be used preferably for various image displays such as a liquid crystal display (LCD) and an EL display (ELD). The image display of the present invention has the same configuration as that of a conventional image display except that at least one of the polarizer and polarizing plate of the present invention is used. A liquid crystal display including, for example, a polarizer of the present invention used therein can be manufactured by, for example, suitably assembling respective components such as liquid crystal cells, optical elements such as a polarizer of the present invention, and if necessary, a lighting system (for example, a backlight), and incorporating a drive circuit thereinto.

The image display of the present invention is used for suitable arbitrary applications. Examples of the applications include office automation equipment such as a desktop personal computer, a notebook personal computer, and a copier, portable devices such as a cell-phone, a watch, a digital camera, a personal digital assistant (PDA), and a hand-held game device, home appliances such as a video camera, a television set, and a microwave oven, car equipment such as a back monitor, a monitor for car navigation system, and a car audio system, display equipment such as information monitors for commercial shops, security equipment such as surveillance monitors, and care and medical equipment such as a monitor for care and a monitor for medical use.

EXAMPLES

Next, examples of the present invention are described together with comparative examples. The present invention is neither specified nor limited by the following examples or comparative examples. In the respective examples and comparative examples, the curl values of polarizers were measured by the following method.

<Curl Value of Polarizer>

Figure 4:
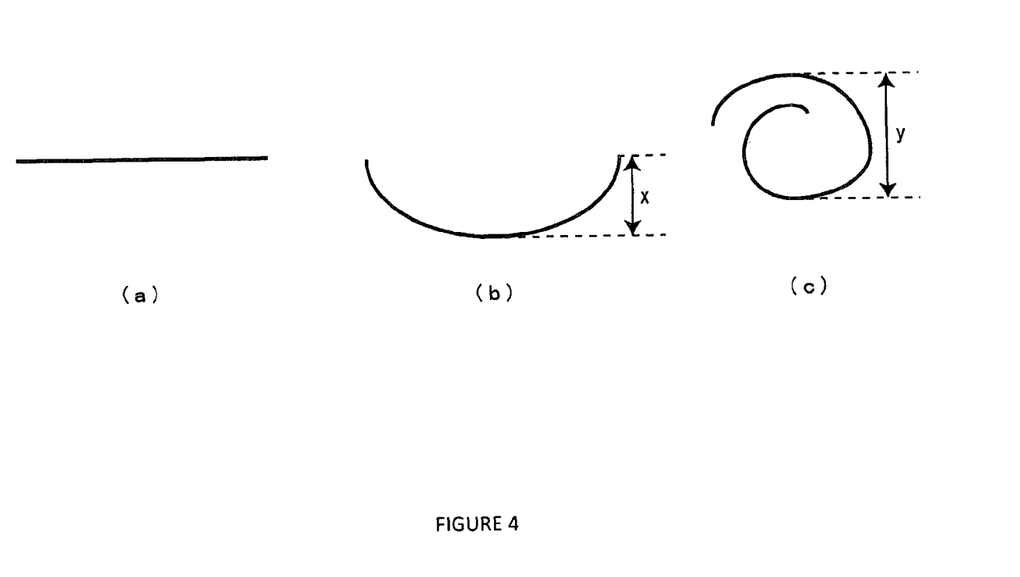
FIG. 4 shows diagrams for explaining a method of measuring a curl value of a polarizer in examples of the present invention.

First, a polarizer was placed on a flat surface. Subsequently, the distance from the flat surface to a part of the polarizer located furthest from the flat surface was measured and was used as the curl value of the polarizer. Specifically, "x" or "y" shown in FIG. 4(b) or 4(c) was measured and was used as the curl value of the polarizer. FIG. 4(a) shows a state where the polarizer has hardly curled and "x" indicated in FIG. 4(b) is less than 0.1 cm.

Example 1

<Preparation of PVA Film>

An original PVA film ("VF-PS" (trade name), manufactured by Kuraray Co., Ltd.) was cut so that the length in the longitudinal direction (MD direction) was 13 cm and the length in the width direction (TD direction) was 6 cm, and thereby a sample PVA film was obtained. This PVA film had a thickness of 75 μm.

<Production of Polarizer>

(1) Swelling Step

In the gas phase, water (pure water, a swelling liquid) with a temperature of 30° C. was sprayed onto both surfaces of the PVA film for 36 seconds. In this case, the distance between a spray nozzle and the PVA film was 5 cm, and the amount of the swelling liquid sprayed onto the PVA film was 0.1 mL/cm$^2$.

(2) Dyeing Step

The PVA film that had been swollen was immersed in an aqueous solution (dye liquid) for 33 seconds. The aqueous solution had a temperature of 30° C. and contained 0.21 wt % of potassium iodide and 0.03 wt % of iodine.

(3) Crosslinking Step

The PVA film was withdrawn from the dye liquid and was then immersed in an aqueous solution (a crosslinking liquid) for 78 seconds. The aqueous solution had a temperature of 45° C. and contained 4 wt % of potassium iodide and 4 wt % of boric acid.

(4) Stretching Step

In each of the swelling step, the dyeing step, and the crosslinking step, the PVA film was stretched at the same time. In this case, the PVA film was stretched in the MD direction. The total stretch ratio was 6.0 with respect to the length of the original PVA film.

(5) Conditioning and Drying Step

The PVA film was withdrawn from the crosslinking liquid and was then immersed in an aqueous solution (a conditioning liquid) for 10 seconds. The aqueous solution had a temperature of 30° C. and contained 4 wt % of potassium iodide. Subsequently, this PVA film was dried at 60° C. for four minutes. Thus, the polarizer of this example was obtained.

Example 2

<Preparation of PVA Film>

A sample PVA film was obtained in the same manner as in Example 1.

<Production of Polarizer>

(1) Swelling Step

In the gas phase, water (pure water, a swelling liquid) with a temperature of 30° C. was sprayed onto both surfaces of the PVA film for 36 seconds. In this case, the distance between a spray nozzle and the PVA film was 5 cm, and the amount of the swelling liquid sprayed onto the PVA film was 0.1 mL/cm$^2$.

(2) Dyeing Step

An aqueous solution (a dye liquid) was sprayed for 33 seconds onto only one surface of the PVA film that had been swollen. The aqueous solution had a temperature of 30° C. and contained 0.7 wt % of potassium iodide and 0.1 wt % of iodine. In this case, the distance between a spray nozzle and the PVA film was 5 cm, and the amount of the dye liquid sprayed onto the PVA film was 0.08 mL/cm$^2$.

(3) Crosslinking Step

An aqueous solution (a crosslinking liquid) was sprayed for 78 seconds onto only one surface (the surface onto which the dye liquid had been sprayed) of the PVA film that had been subjected to the dyeing treatment. The aqueous solution had a temperature of 45° C. and contained 4 wt % of potassium iodide and 4 wt % of boric acid. In this case, the distance between a spray nozzle and the PVA film was 5 cm, and the amount of the crosslinking liquid sprayed onto the PVA film was 0.15 mL/cm$^2$.

(4) Stretching Step

In each of the swelling step, the dyeing step, and the crosslinking step, the PVA film was stretched at the same time. In this case, the PVA film was stretched in the MD direction. The total stretch ratio was 6.0 with respect to the length of the original PVA film.

(5) Conditioning and Drying Step

An aqueous solution (a conditioning liquid) was sprayed for 10 seconds onto only one surface (the surface onto which the dye liquid and the crosslinking liquid had been sprayed) of the PVA film that had been subjected to crosslinking. The aqueous solution had a temperature of 30° C. and contained 4 wt % of potassium iodide. In this case, the distance between a spray nozzle and the PVA film was 5 cm, and the amount of the conditioning liquid sprayed onto the PVA film was 0.02 mL/cm$^2$. Subsequently, this PVA film was dried at 60° C. for four minutes. Thus, the polarizer of this example was obtained.

Comparative Example 1

A polarizer of this comparative example was intended to be produced in the same manner as in Example 1 except that the swelling liquid with a temperature of 30° C. was sprayed onto only one surface of the PVA film in the gas phase for 36 seconds. However, the PVA film was ruptured while being stretched at the same time in the crosslinking step. Thus, it was not possible to obtain a polarizer.

Comparative Example 2

A polarizer of this comparative example was obtained in the same manner as in Example 1 except that the swelling liquid with a temperature of 30° C. was sprayed onto only one surface of the PVA film in the gas phase for 72 seconds.

Comparative Example 3

A polarizer of this comparative example was obtained in the same manner as in Example 2 except that the swelling liquid with a temperature of 30° C. was sprayed onto only one surface of the PVA film in the gas phase for 72 seconds.

Treatment conditions for the respective steps and evaluation results of the polarizers according to the respective examples and comparative examples are indicated in Table 1 below.

TABLE 1

| | Swelling and stretching step | Dyeing and stretching step | Cross-linking and stretching step | Conditioning step | Production of polarizer | Curl values |
|---|---|---|---|---|---|---|
| Ex. 1 | Sprayed on both surfaces (36 sec) | Immersion | Immersion | Immersion | ○ | Less than 0.1 cm |
| Ex. 2 | Sprayed on both surfaces (36 sec) | Sprayed on one surface | Sprayed on one surface | Sprayed on one surface | ○ | Less than 0.1 cm |
| C. Ex. 1 | Sprayed on one surface (36 sec) | Immersion | Immersion | — | x | — |
| C. Ex. 2 | Sprayed on one surface (72 sec) | Immersion | Immersion | Immersion | ○ | 3.5 cm |
| C. Ex. 3 | Sprayed on one surface (72 sec) | Sprayed on one surface | Sprayed on one surface | Sprayed on one surface | ○ | 3.0 cm |

As can be noted from Table 1, the polarizers were prevented from curling in Examples 1 and 2. Thus, this showed that the polarizers each were prevented from curling as long as the swelling liquid was sprayed onto both surfaces of the hydrophilic polymer film in the gas phase in the swelling step, regardless of whether the other steps were carried out by immersion in a liquid or spraying of a liquid. On the other hand, in Comparative Example 1, as described above, the PVA film was ruptured during the production of the polarizer and thus it was not possible to obtain a polarizer. Furthermore, in Comparative Examples 2 and 3, the polarizers curled completely. Accordingly, when the swelling liquid was sprayed only one surface of the hydrophilic polymer film in the swelling step, it was not possible to obtain a polarizer, or curling was not prevented even when a polarizer was obtained.

INDUSTRIAL APPLICABILITY

As described above, the method of manufacturing a polarizer of the present invention makes it possible to manufacture a polarizer that is prevented from curling. Examples of the applications of a polarizer of the present invention as well as a polarizing plate and image display including the same include office automation equipment such as a desktop personal computer, a notebook personal computer, and a copier, portable devices such as a cell-phone, a watch, a digital camera, a personal digital assistant (PDA), and a hand-held game device, home appliances such as a video camera, a television set, and a microwave oven, car equipment such as a back monitor, a monitor for car navigation system, and a car audio system, display equipment such as information monitors for commercial shops, security equipment such as surveillance monitors, and care and medical equipment such as a monitor for care and a monitor for medical use. The applications thereof are not limited and they are applicable over a wide range of fields.

The invention claimed is:

1. A method of manufacturing a polarizer, the method comprising:
a swelling process for swelling a hydrophilic polymer film by bringing the hydrophilic polymer film into contact with a swelling liquid,
a dyeing process for dyeing the hydrophilic polymer film by bringing the hydrophilic polymer film into contact with a dye liquid containing a dichroic material, and
a stretching process for stretching the hydrophilic polymer film,
wherein the contact with the swelling liquid in the swelling process is carried out in a gas phase by spraying the swelling liquid onto both surfaces of the hydrophilic polymer film.

2. The method of manufacturing a polarizer according to claim 1, wherein the swelling liquid is sprayed for at least 20 seconds.

3. The method of manufacturing a polarizer according to claim 1, wherein the amount of the swelling liquid to be sprayed onto the hydrophilic polymer film is in a range of 0.06 to 0.19 mL/cm$^2$.

4. The method of manufacturing a polarizer according to claim 1, wherein the contact with the dye liquid in the dyeing process is carried out in a gas phase by spraying the dye liquid onto at least one surface of the hydrophilic polymer film.

5. The method of manufacturing a polarizer according to claim 1, further comprising a crosslinking process for crosslinking the hydrophilic polymer film by bringing the hydrophilic polymer film into contact with a crosslinking liquid, and a conditioning process for conditioning the hydrophilic polymer film by bringing the hydrophilic polymer film into contact with a conditioning liquid, wherein at least one of the contacts with the crosslinking liquid in the crosslinking process and with the conditioning liquid in the conditioning process is carried out in a gas phase by spraying at least one of the crosslinking liquid and the conditioning liquid onto at least one surface of the hydrophilic polymer film.

6. The method of manufacturing a polarizer according to claim 5, wherein in at least one process selected from the group consisting of the swelling process, the dyeing process, the crosslinking process, and the stretching process, the hydrophilic polymer film is subjected to a continuous treatment while being conveyed.

7. The method of manufacturing a polarizer according to claim 1, wherein the hydrophilic polymer film is a polyvinyl alcohol film and the dichroic material is iodine.

8. A polarizer manufactured by a method of manufacturing a polarizer according to claim 1.

9. A polarizing plate comprising a protective layer stacked on at least one surface of a polarizer,
wherein the polarizer is a polarizer according to claim 8.

10. An image display comprising a polarizer,
wherein the polarizer is a polarizer according to claim 8.

11. An image display comprising a polarizing plate, wherein the polarizing plate is a polarizing plate according to claim 9.

* * * * *